Patented June 27, 1950

2,513,264

UNITED STATES PATENT OFFICE 2,513,264

TRIAZINE DERIVATIVES AND METHODS OF PREPARING THE SAME

Dagfrid Holm-Hansen, Fairfield, Conn., assignor to American Cyanamid Company, New York, N. Y., a corporation of Maine No Drawing. Application December 20, 1946, Serial No. 717,593

17 Claims. (Cl. 260—249.5)

This invention relates to new chemical compounds, more particularly triazine derivatives, and to methods of preparing the same. The invention especially is concerned with the production of chemical compounds represented by the general formula

I

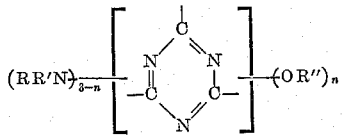

where $n$ represents an integer which is at least 1 and not more than 2, R represents a member of the class consisting of hydrogen and alkyl radicals containing at least 12 and not more than 18 carbon atoms, R' represents an alkyl radical containing at least 12 and not more than 18 carbon atoms, and R'' represents a primary aliphatic hydrocarbon radical.

Illustrative examples of alkyl radicals which R and R' in the above formula may represent are: dodecyl, tetradecyl, hexadecyl, octadecyl, etc. Illustrative examples of radicals which R'' in the aforesaid formula may represent are: saturated and unsaturated monovalent aliphatic hydrocarbon radicals derived from a primary aliphatic monohydric alcohol, e. g., methyl, ethyl, propyl, butyl (n-butyl), amyl, hexyl, heptyl, octyl, nonyl, decyl, dodecyl, tetradecyl, hexadecyl octadecyl, allyl, methallyl, ethallyl, propallyl, 2-butenyl, 3-methyl-2-butenyl, 3-methyl-3-butenyl, 2-pentenyl, 3-butenyl, 3-pentenyl, 4-pentenyl, 2-methyl-2-pentenyl, 3-methyl-4-pentenyl, 2-hexenyl, 2-octenyl, 3-nonenyl, 2-decenyl, etc., alcohols.

The new compounds of this invention may be used, for example, as plasticizers, insecticides, bactericides, and as intermediates in the preparation of other compounds or compositions. They are especially valuable for use in the preparation of resinous materials by reaction with a polyhydric alcohol, more particularly a dihydric alcohol, as disclosed and broadly claimed in the copending application of Frederic C. Schaefer, Serial No. 717,606, filed concurrently herewith, now Patent No. 2,481,156, issued September, 6, 1949; and in making non-ionic, surface-active linear polymers and other synthetic materials as disclosed and specifically claimed in the copending application of Pierrepont Adams, Serial No. 717,590, also filed concurrently herewith and now abandoned. Compounds having a hydrogen atom attached to the nitrogen atom of the amino grouping may be reacted with an aldehyde, e. g., formaldehyde, to yield a thermoplastic resinous material. Such compounds also may be reacted with a dihydric alcohol to yield a thermoplastic linear polymer which is then reacted with an aldehyde, specifically formaldehyde, to form a thermosetting or potentially thermosetting resin as more fully disclosed and broadly claimed in the copending application of Frederic C. Schaefer, Serial No. 717,605, also filed concurrently herewith, now Patent No. 2,481,155, issued September 6, 1949. Compounds of this invention also may be used as solvents or as dispersion media, while those which contain an allyl or other polymerizable grouping may be employed alone or in combination with other polymerizable materials to yield new synthetic materials (polymers and copolymers) of particular utility in the plastics and coating arts.

Various methods may be used to prepare the chemical compounds of my invention. I prefer to prepare them by effecting reaction under alkaline conditions and in the presence of an inorganic base between (1) a compound represented by the general formula

II

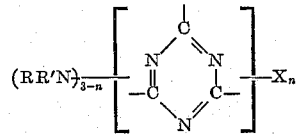

where R and R' have the same meanings as given in Formula I and X represents a halogen selected from the class consisting of bromine and chlorine, and (2) a primary aliphatic monohydric alcohol represented by the formula R''OH where R'' is a primary aliphatic hydrocarbon radical. The alcohol is employed in an amount corresponding to at least one mol thereof for each atom represented by X in the formula for the compound of (1). The desired chemical compound embraced by Formula I is then isolated from the reaction mass.

The reaction may be carried out under a variety of temperature and pressure conditions, for instance, at normal or at elevated temperatures, e. g., at the reflux temperature of the mixed reactants, and at atmospheric or superatmospheric pressure. However, atmospheric pressure and temperatures not substantially exceeding about 50° C., for instance, temperatures of the order of about 10° to 40° C. and more particularly ordinary room temperatures (20°-30° C.) are preferred. In general, the yields are somewhat higher when the reaction is effected in large part at temperatures of about 10° to 40° or 50° C. or thereabouts than when the reaction is carried out in its entirety at the reflux temperature of the mixed reactants. In order to insure complete reaction and thereby to obtain an optimum yield, the reaction mass may be heated at an elevated temperature, e. g., temperatures of the order of 70° to 80° C. or even up to the reflux temperature of the reaction mass, toward the end of the reaction period.

If desired, the reaction may be effected in the presence of an inert solvent or mixture of solvents, that is, one which will not react with the reactants in the reaction mass. Illustrative examples of solvents that may be employed are ethers (e. g., diethyl ether, dibutyl ether, etc.), ketones (e. g., acetone, diethyl ketone, methyl ethyl ketone, etc.), liquid hydrocarbons (e. g., benzene, toluene, xylene, etc.), dialkyl ethers of ethylene glycol (e. g., dimethyl ether of ethylene glycol, diethyl ether of ethylene glycol, etc.), dioxane, etc.

Various inorganic bases may be employed. I prefer to use an inorganic base that will react with the chlorine or bromine of the chloro or bromo triazine reactant to form a salt, more particularly a water-soluble salt, and which will provide alkaline conditions in the reaction mass during the entire reaction period. Illustrative examples of inorganic bases that may be employed are alkali-metal hydroxides (e. g., sodium hydroxide, potassium hydroxide, lithium hydroxide, etc.), alkali-metal carbonates (e. g., sodium carbonate, potassium carbonate, lithium carbonate, etc.), calcium hydroxide, barium hydroxide, trisodium phosphate, etc. Mixtures of inorganic bases may be used if desired.

The use of sodium hydroxide or of sodium carbonate is generally to be preferred, although the former, in some cases, may impart more color to the reaction mixture and thence into the final product. If, for example, sodium hydroxide is employed, it is preferably used in the form of a powder, and it is added to the alcohol prior to the addition of the halogenotriazine. Such inorganic bases readily dissolve in the lower alcohols, e. g., methyl alcohol, ethyl alcohol, allyl alcohol, etc., but a suspension of the base ordinarily results when it is added to the higher alcohols. However, a sufficient quantity of the base usually dissolves to maintain an alkaline condition in the reaction mass and to prevent direct reaction of the halogenotriazine with the primary aliphatic monohydric alcohol to form hydroxytriazines. Although the base, e. g., sodium hydroxide, can be added as an aqueous solution, this practice is usually not desirable because increasing quantities of hydroxytriazines are obtained when increasing amounts of water are present. Consequently, the yield of the desired ester is reduced in a direct ratio with the amount of water.

Sodium carbonate is equally or more effective than sodium hydroxide in practicing my invention, but among its disadvantages are the evolution of carbon dioxide and the larger quantity required. There is also some evidence that higher temperatures are required to complete the reaction if sodium carbonate is used than if sodium hydroxide is employed. However, higher yields of the desired compound may be generally obtained through the use of sodium carbonate and less discoloration of the product occurs.

The amount of inorganic base may be varied considerably, but to insure alkaline conditions during the entire reaction period it preferably is employed in an amount corresponding to at least 1 mol thereof for each atom of halogen (chlorine or bromine) in the halogenotriazine reactant.

The amount of primary aliphatic monohydric alcohol that is employed likewise may be varied considerably, but in all cases it is used in an amount corresponding to at least 1 mol of the alcohol for each atom of halogen (chlorine or bromine) in the halogenotriazine reactant. I prefer to use an excess of the primary alcohol over the stoichiometrical amount required, for instance, from a 5 to 10% molecular excess to 15 or 20 or more times the stoichiometrical amount necessary. It is possible to use a secondary alcohol but the reaction is slower and more side reactions occur, so that the yield of the end-product is substantially lower as compared with the yield obtained when a primary alcohol is employed.

In practicing my invention, alkaline conditions should prevail in the reaction mass during the entire reaction period. These conditions are obtained when an inorganic base is used that will provide alkaline conditions during the reaction period and when the base is employed in an amount such as indicated hereinbefore. When a preferred inorganic base, hydrohalide acceptor is employed, e. g., sodium hydroxide or sodium carbonate, the halogen salt that forms during the reaction usually precipitates from the reaction mass, especially when a large excess of alcohol is used. After the salt has been filtered from the reaction mass the excess alcohol is distilled off, leaving the desired triazine derivative which, depending upon the particular reactants employed, may comprise, for instance, a 2-dodecylamino-4,6-dialkoxy-1,3,5-triazine (e. g., 2-dodecylamino-4,6 - dimethoxy - 1,3,5-triazine, 2-dodecylamino-4,6-diethoxy-1,3,5-triazine, etc.), a 2-dodecylamino-4,6-dialkenoxy-1,3,5-triazine (e. g., 2-dodecylamino - 4,6 - dialloxy - 1,3,5 - triazine, 2-dodecylamino - 4,6 - dimethalloxy - 1,3,5 - triazine, etc.), a 2-octadecylamino-4,6-dialkenoxy-1,3,5-triazine (e. g., 2-octadecylamino-4,6-dialloxy-1,3,5-triazine, 2 - octadecylamino-4,6-dimethalloxy-1,3,5-triazine, etc.). The crude triazine derivative thereby obtained may be purified by suitable means, e. g., by recrystallization from a solvent. If desired, the solution of the crude compound may be treated with a decolorizing carbon prior to crystallization.

Good yields of the desired compounds are obtained from the amino-dihalogenotriazines and the halogenodiaminotriazines if these halogeno (chloro and bromo) intermediates are used in dry state. With particular reference to the diesters, better yields thereof, in general, are obtained when the esters of the lower alcohols are prepared. If the intermediate aminodohalogenotriazine is used in a moist state, the yields are decreased in proportion to the amount of water present. It is therefore desirable to use a dry intermediate if it can be readily prepared in this condition. However, in many cases it is more convenient and economical to prepare the amino-dihalogenotriazine in an aqueous medium. This is particularly true of the N-substituted triazine derivatives, because it is usually more economical to use one mol of alkali than to use an extra mol of amine to neutralize the hydrochloric acid formed in the reaction of the cyanuric chloride with the amine. Since the wet intermediate very often cannot be dried without appreciable hydrolysis thereof, the presence of water results in lower yields of the dialkoxy or dialkenoxy triazine derivatives.

The same considerations which apply to the preparation of the diesters by the above-described method apply as well to the preparation of the monoester except for a difference in the reactivity of the intermediate halogenotriazine. The monohalogeno (monochloro and monobromo) triazine derivatives are more resistant to hydrolysis than the corresponding dihalogeno derivatives, and hence the monohalogeno intermediates are more easily made in a dry state. The lower degree of reactivity of the mono-halogeno derivatives necessitates more drastic conditions for the preparation of monoesters therefrom, and the yields of these esters are generally lower than those of the corresponding diesters.

In order that those skilled in the art better may understand how the present invention may be carried into effect, the following examples are given by way of illustration and not by way of limitation. All parts are by weight.

EXAMPLE 1

*Preparation of 2-octadecylamino-4,6-dialloxy-1,3,5-triazine*

|  | Parts | Approx. Molar Ratios |
|---|---|---|
| Cyanuric chloride | 92.2 | 0.5 |
| Acetone | 715.0 | |
| Octadecylamine | 135.0 | 0.5 |
| Sodium hydroxide | 20.0 | 0.5 |
| Allyl alcohol | 428.0 | 7.4 |
| Sodium hydroxide | 40.0 | 1.0 |

2-octadecylamino-4,6-dichloro-1,3,5-triazine is first prepared by dissolving the above-stated amount of cyanuric chloride in hot acetone and filtering the resulting solution into a suitable reaction vessel. The octadecylamine dissolved in acetone is slowly added to the acetone solution of the cyanuric chloride at 0° to 5° C. A 40% aqueous solution of 20 parts of sodium hydroxide is added to the mixed solutions at the same temperature. The mixture is stirred for 1 hour, yielding a solution containing 2-octadecylamino-4,6-dichloro-1,3,5-triazine.

A solution of 40 parts of sodium hydroxide dissolved in about 428 parts of allyl alcohol is added to the octadecylaminochlorotriazine solution at a temperature of 10° C. or less. After standing for about 16 hours, the mixture is heated to 60° C. and filtered, yielding a filtrate containing 2-octadecylamino - 4,6 - dialloxy - 1,3,5-triazine. A small amount of solid separates in the filtrate. The filtrate is cooled and refiltered. Twenty-four parts of a yellow solid thereby obtained melts at 82°–96° C. after crystallization from acetone. It gives a positive Beilstein test and is probably 2-chloro - 4 - octadecylamino-6-alloxy-1,3,5-triazine.

The salt separated by the first filtration gives 4.5 parts of the same material when extracted with acetone. The main filtrate is evaporated under reduced pressure to remove acetone and excess allyl alcohol. The dark, viscous solution that remains and which comprises 2-octadecylamino- 4,6-dialloxy-1,3,5-triazine hardens to a waxy material at 0° C. The yield is 162 parts, which corresponds to 70% of the theoretical.

EXAMPLE 2

*Preparation of 2-dodecylamino-4,6-dialloxy-1,3,5-triazine*

|  | Parts | Approx. Molar Ratios |
|---|---|---|
| Cyanuric chloride | 185.5 | 1.0 |
| Dodecylamine | 185.0 | 1.0 |
| Sodium carbonate | 53.0 | 0.5 |
| Allyl alcohol | 684.0 | 11.8 |
| Sodium hydroxide | 80.0 | 2.0 |
| Dioxane | 414.0 | |

Into a mixture of 800 parts of crushed ice and water contained in a round-bottomed vessel equipped with a mechanical stirrer, there is filtered a solution prepared by dissolving the above-stated amount of cyanuric chloride in the stated amount of dioxane. The solution of cyanuric chloride is added to the vigorously stirred water-ice mixture at such a rate that a finely divided suspension of the cyanuric chloride in the water is obtained. The temperature is maintained at 0° C. by means of an ice bath. To this slurry of cyanuric chloride there is added simultaneously a solution of 185 parts of dodecylamine in about 200 parts of acetone, and 53 parts of sodium carbonate dissolved in 250 parts of water. The addition of the two solutions requires about 1 hour at 0°–5° C. After the two solutions have been added, the reaction mixture is stirred at 5°–10° C. for 1 hour and then filtered by suction on a Büchner funnel to isolate 2-dodecylamino-4,6-dichloro-1,3,5-triazine.

The moist 2-dodecylamino-4,6-dichloro-1,3,5-triazine is charged into a round-bottomed, three-necked vessel equipped with a stirrer, a reflux condenser, and a thermometer and containing a solution of 80 parts of sodium hydroxide dissolved in about 684 parts of allyl alcohol and cooled to 0° C. The stirrer is started immediately and, after 10 minutes, the vessel is warmed to room temperature by placing it on a steam bath and then kept at room temperature for 30 minutes. The reaction mixture is thereafter heated to 60° C. for 15 minutes and filtered through a Büchner funnel to remove the precipitated sodium chloride. The filtrate is placed in a distilling vessel and the excess allyl alcohol removed by distillation under reduced pressure. The oil which remains solidifies upon standing. The crude 2-dodecylamino-4,6-dialloxy-1,3,5-triazine amounts to 308 parts (82 per cent of the theoretical) and melts at 48°–52° C. Purification is effected by crystallization from methanol, and from which the pure material crystallizes in white, waxy needles melting at 49°–51° C. A sample which has been crystallized from methanol gives the following analysis:

|  | Percent C | Percent H | Percent N |
|---|---|---|---|
| Calculated for $C_{21}H_{36}N_4O_2$ | 66.98 | 9.64 | 14.88 |
| Found | 66.90–65.73 | 8.99–9.99 | 15.46 |
|  |  |  | 15.63 |

EXAMPLE 3

*Preparation of 2-octadecylamino-4,6-dimethoxy-1,3,5-triazine*

One hundred and sixty-eight parts of sodium bicarbonate and 185 parts of cyanuric chloride are added to 500 parts of a solution containing 90% methyl alcohol and 10% water. The mixed ingredients are allowed to react at 30° to 35° C. until the evolution of carbon dioxide has diminished, after which the reaction mass is heated to reflux temperature in 15 minutes and thereafter refluxed for 25 minutes. The resulting 2-chloro-4,6-dimethoxy-1,3,5-triazine is cooled to 35° C., after which 269 parts of octadecylamine is added slowly while cooling the mass, followed by the addition of 84 parts of sodium bicarbonate. The resulting mixture is heated under reflux at the boiling temperature of the mass for 1 hour, cooled, diluted with water and filtered. The crude, waxy 2-octadecylamino-4,6-dimethoxy-1,3,5-triazine produced in this manner is mixed with 1000 parts of a 1% aqueous solution of sodium hydroxide, warmed to 70° C. and then allowed to cool slowly. The solid layer that separates is removed, washed with water and dried at 50° C., thereby yielding purified 2-octadecylamino-4,6-dimethoxy-1,3,5-triazine which is a wax-like material.

EXAMPLE 4

*Preparation of 2-dodecylamino-4,6-dimethoxy-1,3,5-triazine*

2-dodecylamino-4,6-dimethoxy-1,3,5-triazine is prepared in essentially the same manner as described under Example 3 with reference to the production of 2-octadecylamino-4,6-dimethoxy-1,3,5-triazine with the exception that in this case 185 parts of dodecylamine is used in place of 269 parts of octadecylamine. Also, in this instance, the crude product is dissolved in ether and then washed with dilute alkali and water. The ether is evaporated by heating the washed material on a steam bath, after which the purified product is dried in a vacuum desiccator over sulfuric acid. The dried product is a wax-like material.

Examples 3 and 4 are illustrative of methods of preparing the new compounds of this invention in accordance with a reaction which may be graphically represented by the following general equation:

III

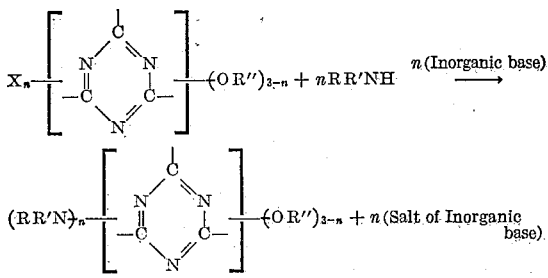

In the above equation $n$, R, R', R'', and X have the same meanings as given above with reference to Formulas I and II (see Formula II for the meaning of X).

EXAMPLE 5

*Preparation of 2-ethoxy-4,6-di-(tetradecylamino)-1,3,5-triazine*

| | Parts | Approx. Molar Ratios |
|---|---|---|
| 2-Chloro-4,6-di-(tetradecylamino)-1,3,5-triazine | 537.5 | 1 |
| Ethanol | 920.0 | 20 |
| Sodium hydroxide | 40.0 | 1 |

The sodium hydroxide is dissolved in the alcohol, after which the chlorotriazine derivative is added thereto. The resulting mixture is heated to reflux temperature with agitation, and then refluxed for 1 hour. The resulting reaction mass is filtered, yielding a filtrate containing 2-ethoxy-4,6-di-(tetradecylamino)-1,3,5-triazine. The excess ethyl alcohol is removed from the filtrate, as by evaporation or distillation, leaving a residue of 2-ethoxy-4,6-di-(tetradecylamino)-1,3,5-triazine which is a waxy solid at room temperature.

2 - chloro - 4,6 - di - (tetradecylamino) - 1,3,5-triazine is prepared, for example, by dissolving 92.2 parts cyanuric chloride in about 475 parts hot acetone, filtering the resulting solution in a suitable vessel and cooling the solution to 0° C. One hundred and thirty-five parts of tetradecylamine dissolved in about 317 parts acetone is added to the cyanuric chloride solution while the temperature is kept below 5° C. A 20% sodium hydroxide solution is added slowly so that the temperature remains below 5° C., and so that the solution is kept neutral to pH paper.

After the addition of the alkali at 5° C., another 135 parts of tetradecylamine is added and the temperature is raised to 20° C. The mixture is stirred until it becomes neutral to pH paper, and then 20.9 parts of 96% sodium hydroxide is added at such a rate that the mixture remains neutral or slightly basic to pH paper. The mixture is heated to 50° C. for 1 hour, cooled and a yellow solid separated from the solution. This product comprising 2-chloro-4,6-di-(tetradecylamino)-1,3,5-triazine is washed until it is free from chloride ion and dried in a vacuum desiccator.

If it is desired to produce a halogeno (chloro or bromo) di-(substituted amino) triazine derivative wherein the substituted amino groupings are different, this may be done, for example, by reacting cyanuric chloride or bromide with one mol equivalent of one substituted amine, isolating the resulting dihalogeno derivative and reacting it with one mol equivalent of a different substituted amine.

EXAMPLE 6

*Preparation of 2-methalloxy-4,6-di-(octadecylamino)-1,3,5-triazine*

| | Parts | Approx. Molar Ratios |
|---|---|---|
| 2-Chloro-4,6-di-(octadecylamino)-1,3,5-triazine | 649.5 | 1 |
| Methallyl alcohol | 1,030.0 | 15 |
| Sodium hydroxide | 40.0 | 1 |

The same procedure is followed as described under Example 5. The product is a waxy solid at room temperature.

2 - chloro - 4,6 - di - (octadecylamino) - 1,3,5-triazine is prepared, for instance, by pouring a solution of 370 parts (2 mols) of cyanuric chloride dissolved in about 1190 parts of acetone into 15,000 parts of stirred ice water. While maintaining the temperature at 0°–5° C., a solution of 1076 parts (4 mols) of octadecylamine in about 2170 parts of dioxane is added. The solution is then warmed to 25° C. and a solution of 212 parts (2 mols) of sodium carbonate in 2000 parts of water is slowly added. After addition, the resulting creamy mass is stirred one-half hour longer, the solid filtered as dry as possible and air dried. The crude material comprising 2 - chloro - 4,6 - di - (octadecylamino) - 1,3,5-triazine weighs 1370 parts (theoretical equals 1300 parts), softens around 105° C., and melts at 122°–125° C. Crystallization first from a large volume of an 80% dioxane-20% acetone mixture and then from butanol gives a colorless product which melts at 136°–137° C. and shows the following analysis:

|  | Per Cent C | Per Cent H | Per Cent Cl |
|---|---|---|---|
| Calculated for $C_{39}H_{76}N_5Cl$ |  71.99 | 11.78 | 5.45 |
| Found | 71.98 | 11.83 | 5.51 |
|  | 71.72 | 11.83 | 5.69 |

It will be understood, of course, by those skilled in the art that my invention is not limited to the specific reactants named in the above illustrative examples. Thus, instead of methyl, ethyl, allyl or methallyl alcohols, any other primary aliphatic monohydric alcohol, numerous examples of which hereinbefore have been given, may be employed.

Illustrative examples of halogenotriazines that may be used in practicing the present invention, depending upon the particular method of preparation and the particular end product desired, are:

2-dodecylamino-4,6-dichloro-1,3,5-triazine
2-tetradecylamino-4,6-dibromo-1,3,5-triazine
2-hexadecylamino-4,6-dichloro-1,3,5-triazine
2-octadecylamino-4,6-dibromo-1,3,5-triazine
2 - chloro-4-dodecylamino - 6 - hexadecylamino-1,3,5-triazine
2-bromo-4,6-di-(dodecylamino)-1,3,5-triazine
2 - bromo-4-tetradecylamino-6-octadecylamino-1,3,5-triazine
2-chloro-4,6-di-(tetradecylamino)-1,3,5 - triazine
2 - chloro-4-dodecylamino - 6 - tetradecylamino-1,3,5-triazine
2-bromo-4,6-di-(hexadecylamino)-1,3,5 - triazine
2-bromo-4-hexadecylamino - 6 - octadecylamino-1,3,5-triazine
2-chloro-4,6-di-(octadecylamino)-1,3,5-triazine
2-bromo-4,6-dimethoxy-1,3,5-triazine
2-methoxy-4,6-dichloro-1,3,5-triazine
2-bromo-4,6-dialloxy-1,3,5-triazine
2-alloxy-4,6-dichloro-1,3,5-triazine
2-chloro-4,6-diethoxy-1,3,5-triazine
2-bromo-4,6-dipropoxy-1,3,5-triazine
2-propoxy-4,6-dichloro-1,3,5-triazine
2-chloro-4,6-dimethalloxy-1,3,5-triazine
2-bromo-4,6-dibutoxy-1,3,5-triazine
2-bromo-4,6-di-(2'-butenoxy)-1,3,5-triazine
2-(2'-butenoxy)-4,6-dichloro-1,3,5-triazine
2-chloro-4,6-dipentoxy-1,3,5-triazine
2-chloro-4,6-dihexoxy-1,3,5-triazine
2-chloro-4,6-di-(3'-butenoxy)-1,3,5-triazine
2-bromo-4,6-diheptoxy-1,3,5-triazine
2-heptoxy-4,6-dibromo-1,3,5-triazine
2-chloro-4,6-di-(3'-methyl-2'-butenoxy) - 1,3,5-triazine
2-(3'-methyl-2'-butenoxy) - 4,6 - dibromo-1,3,5-triazine
2-bromo-4,6-dioctoxy-1,3,5-triazine
2-chloro-4,6-di-(octadecoxy)-1,3,5-triazine
2-octadecoxy-4,6-dichloro-1,3,5-triazine
2-bromo-4,6-di-(2'-hexenoxy)-1,3,5-triazine
2-chloro-4,6-di-(2'-decenoxy)-1,3,5-triazine
2-(2'-decenoxy)-4,6-dibromo-1,3,5-triazine Illustrative examples of chemical compounds embraced by Formula I that may be produced in accordance with the present invention are:

2-dodecylamino-4,6-diethoxy-1,3,5-triazine
2-methoxy-4,6-di-(dodecylamino)-1,3,5-triazine
2-alloxy-4,6-di-(dodecylamino)-1,3,5-triazine
2-tetradecylamino-4,6-dimethoxy-1,3,5-triazine
2-tetradecylamino-4,6-dialloxy-1,3,5-triazine
2-ethoxy-4,6-di-tetradecylamino)-1,3,5-triazine
2-methalloxy - 4,6 - di - (tetradecylamino)-1,3,5-triazine
2-hexadecylamino-4,6-dipropoxy-1,3,5-triazine
2 - hexadecylamino-4,6-di-(2'-butenoxy) - 1,3,5-triazine
2-butoxy-4,6-di-(hexadecylamino)-1,3,5-triazine
2 - (3' - butenoxy) - 4,6 - di - (hexadecylamino) - 1,3,5-triazine
2-octadecylamino-4,6-diethoxy-1,3,5-triazine
2-octadecylamino-4,6-dipentoxy-1,3,5-triazine
2 - octadecylamino-4,6-di-(2'-decenoxy) - 1,3,5-triazine
2-pentoxy-4,6-di-(octadecylamino)-1,3,5-triazine
2-octadecoxy - 4,6 - di - (octadecylamino)-1,3,5-triazine
2-nonenoxy-4,6-di-(octadecylamino) - 1,3,5 - triazine
2-dodecylamino-4-methoxy-6-ethoxy - 1,3,5 - triazine
2-tetradecylamino-4-alloxy-6-methalloxy - 1,3,5-triazine
2-dodecylamino - 4,6 - di - (2'-pentenoxy)-1,3,5-triazine
2 - tetradecylamino-4,6-di-(tetradecoxy) - 1,3,5-triazine
2-hexadecylamino-4,6-dihexoxy-1,3,5-triazine
2-octadecylamino-4,6-di-(3'-methyl - 3' - butenoxy)-1,3,5-triazine
2 - hexadecylamino-4-ethoxy-6-octoxy-1,3,5-triazine
2-octoxy-4,6-di-(dodecylamino)-1,3,5-triazine
2-methoxy-4,6-di-(tetradecylamino) - 1,3,5 - triazine
2-octadecylamino - 4 - butoxy-6-pentoxy - 1,3,5-triazine
2-methoxy-4-tetradecylamino-6-octadecylamino-1,3,5-triazine
2 - alloxy - 4 - dodecylamino-6-hexadecylamino-1,3,5-triazine
2 - ethoxy - 4 - dodecylamino-6-tetradecylamino-1,3,5-triazine
2 - butoxy-4-hexadecylamino-6-octadecylamino-1,3,5-triazine
2-octadecylamino-4,6-didecoxy-1,3,5-triazine Those of the above compounds wherein the ester groupings are different are prepared, for instance, by converting an alkylamino dichloro or dibromo triazine to the corresponding monochloro or monobromo monoester of the triazine by reaction with an alcohol in the presence of one equivalent of a base. The resulting compound is isolated and then similarly caused to react with a different alcohol in the presence of a base.

Other examples will be apparent to those skilled in the art from the foregoing examples of halogenotriazine reactants and from the first and second paragraphs of this specification.

I claim:
1. Chemical compounds represented by the general formula

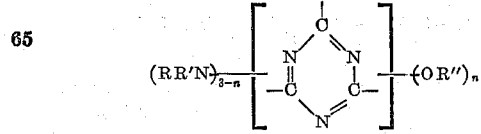

where $n$ represents an integer which is at least 1 and not more than 2, R represents a member of the class consisting of hydrogen and alkyl radicals containing at least 12 and not more than 18 carbon atoms, R' represents an alkyl radical containing at least 12 and not more than 18 carbon atoms, and R'' represents a primary aliphatic hydrocarbon radical.

2. Chemical compounds as in claim 1 wherein R represents hydrogen.

3. Chemical compounds as in claim 1 wherein R represents hydrogen, n is 2 and R'' represents an alkyl radical.

4. Chemical compounds as in claim 1 wherein R represents hydrogen, n is 2 and R'' represents an alkenyl radical.

5. A 2-dodecylamino-4,6-dialkoxy-1,3,5-triazine represented by the general formula

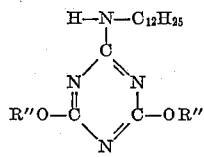

where each R'' represents an alkyl radical.

6. 2-dodecylamino-4,6-dimethoxy - 1,3,5-triazine, the formula for which is

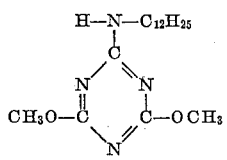

7. A 2-dodecylamino-4,6-dialkenoxy-1,3,5-triazine represented by the general formula

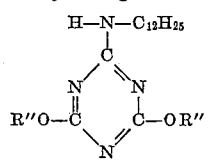

where each R'' represents an alkenyl radical.

8. 2 - dodecylamino-4,6-dialloxy-1,3,5-triazine, the formula for which is

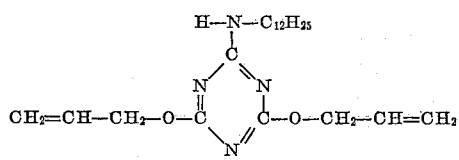

9. A 2-octadecylamino - 4,6 - dialkenoxy-1,3,5-triazine represented by the general formula

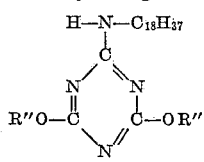

where each R'' represents an alkenyl radical.

10. 2 - octadecylamino-4,6-dialloxy-1,3,5-triazine, the formula for which is

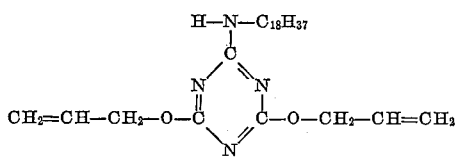

11. The method of preparing a chemical compound represented by the general formula

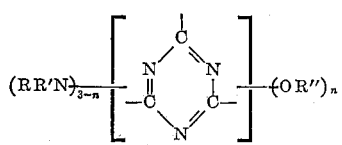

where $n$ represents an integer which is at least 1 and not more than 2, R represents a member of the class consisting of hydrogen and alkyl radicals containing at least 12 and not more than 18 carbon atoms, R' represents an alkyl radical containing at least 12 and not more than 18 carbon atoms, and R'' represents a primary aliphatic hydrocarbon radical, said method comprising effecting reaction under alkaline conditions and in the presence of a completely inorganic base between (1) a compound represented by the general formula

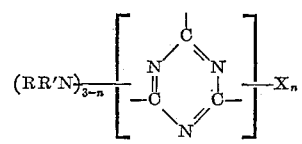

where R and R' have the meanings above given and X represents a halogen selected from the class consisting of chlorine and bromine, and (2) a primary aliphatic monohydric alcohol represented by the formula R''OH where R'' has the meaning above given, said alcohol being employed in an amount corresponding to at least one mol thereof for each atom represented by X in the formula for the compound of (1), and isolating the chemical compound represented by the first-given formula from the resulting reaction mass.

12. A method as in claim 11 wherein X in the formula of the compound of (1) represents chlorine.

13. A method as in claim 11 wherein the inorganic base is sodium hydroxide.

14. A method as in claim 11 wherein the inorganic base is sodium carbonate.

15. The method of preparing a chemical compound represented by the general formula

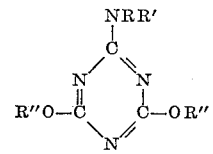

where R represents a member of the class consisting of hydrogen and alkyl radicals containing at least 12 and not more than 18 carbon atoms, R' represents an alkyl radical containing at least 12 and not more than 18 carbon atoms, and R'' represents a primary aliphatic hydrocarbon radical, said method comprising effecting reaction under alkaline conditions and in the presence of an alkali-metal hydroxide between (1) a compound represented by the general formula

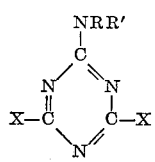

where R and R' have the meanings above given and X represents a halogen selected from the class consisting of chlorine and bromine, and (2) a primary aliphatic monohydric alcohol, said alcohol and said alkali-metal hydroxide each being employed in an amount corresponding to at least two mols thereof per mol of the compound of (1), and isolating the compound represented by the first-given formula from the resulting reaction mass.

16. Chemical compounds corresponding to the general formula

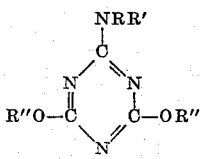

where R represents a member of the class consisting of hydrogen and alkyl radicals containing at least 12 and not more than 18 carbon atoms, R' represents an alkyl radical containing at least 12 and not more than 18 carbon atoms, and R'' represents a primary aliphatic hydrocarbon radical.

17. The method of preparing 2-dodecylamino-4,6-diallkoxy-1,3,5-triazine which comprises adding 2-dodecylamino-4,6-dichloro-1,3,5-triazine to a cold solution of sodium hydroxide dissolved in allyl alcohol, the said ingredients being employed in a molar ratio of approximately 2 mols of sodium hydroxide and 11.8 mols of allyl alcohol for each mol of 2-dodecylamino-4,6-dichloro-1,3,5-triazine, agitating the resulting reaction mass while warming it to bring it to room temperature and for a period of the order of 30 minutes at room temperature, continuing the agitation of the said mass while heating it to 60° C. for a period of the order of 15 minutes, filtering the reaction mass to remove the sodium chloride which is formed as a by-product of the reaction, distilling the excess allyl alcohol from the filtrate under reduced pressure thereby to obtain a residue of crude 2-dodecylamino-4,6-dialloxy-1,3,5-triazine, and crystallizing the said crude product from methanol to obtain white, waxy needles of 2-dodecylamino-4,6-dialloxy-1,3,5-triazine melting at 49°–51° C.

DAGFRID HOLM-HANSEN.

REFERENCES CITED

The following references are of record in the file of this patent:

UNITED STATES PATENTS

| Number | Name | Date |
|---|---|---|
| 2,295,574 | Freidheim | Sept. 5, 1942 |
| 2,394,042 | D'alelio | Feb. 5, 1946 |
| 2,394,306 | Heintrich | Feb. 5, 1946 |
| 2,443,741 | Kropa | June 22, 1948 |

OTHER REFERENCES

Controulis: J. Amer. Chem. Soc., Nov. 1945, pp. 1946–1948.

Certificate of Correction

Patent No. 2,513,264 June 27, 1950

DAGFRID HOLM-HANSEN

It is hereby certified that error appears in the printed specification of the above numbered patent requiring correction as follows:

Column 4, lines 67 and 68, for "aminodohalogenotriazine" read *aminodihalogenotriazine*; column 6, last table of Example 2, second column thereof, strike out

| | | |
|---|---|---|
| " 66.98" | and insert instead | *66.98* |
| 66.90–65.73 | | *66.90—* |
| | | *65.73* | same table, third column, strike out

| | | |
|---|---|---|
| " 9.64" | and insert instead | *9.64* |
| 8.99–9.99 | | *8.99—* |
| | | *9.99* | column 10, line 2, after "di–" and before "tetradecylamino" insert an opening parenthesis; column 13, line 18, for "diallkoxy" read *dialloxy*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*